US010735506B2

(12) United States Patent
Burba et al.

(10) Patent No.: US 10,735,506 B2
(45) Date of Patent: Aug. 4, 2020

(54) TECHNIQUES FOR PEER MATCHING IN PEER-TO-PEER COMMUNICATIONS

(71) Applicant: Microsoft Technology Licensing, LLC, Redmond, WA (US)

(72) Inventors: Alexander Burba, Seattle, WA (US); Brandon T. Hunt, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 32 days.

(21) Appl. No.: 15/799,650

(22) Filed: Oct. 31, 2017

(65) Prior Publication Data
US 2019/0132385 A1    May 2, 2019

(51) Int. Cl.
H04L 29/08    (2006.01)
H04W 4/08    (2009.01)
H04W 8/00    (2009.01)

(52) U.S. Cl.
CPC ........ H04L 67/1063 (2013.01); H04L 67/104 (2013.01); H04L 67/1044 (2013.01); H04W 4/08 (2013.01); H04L 67/1078 (2013.01); H04W 8/005 (2013.01)

(58) Field of Classification Search
CPC ........... H04W 4/08; H04W 8/00; H04W 4/70; H04L 29/08; H04L 67/1063; H04L 67/1044; H04L 67/1078
See application file for complete search history.

(56) References Cited

U.S. PATENT DOCUMENTS

| | | | |
|---|---|---|---|
| 2002/0156875 A1* | 10/2002 | Pabla | H04L 1/24 709/220 |
| 2012/0290730 A1 | 11/2012 | Desai et al. | |
| 2014/0169259 A1* | 6/2014 | Lee | H04L 12/189 370/312 |
| 2015/0296426 A1* | 10/2015 | Mildh | H04W 36/0055 455/436 |
| 2016/0352623 A1* | 12/2016 | Jayabalan | H04L 45/28 |
| 2017/0127276 A1* | 5/2017 | Koo | H04L 9/3226 |
| 2018/0367608 A1* | 12/2018 | Miyaki | H04L 67/1061 |

FOREIGN PATENT DOCUMENTS

| | | | | |
|---|---|---|---|---|
| EP | 1487181 A2 * | 12/2004 | | H04L 29/06 |
| EP | 1487181 A2 | 12/2004 | | |

OTHER PUBLICATIONS

"International Search Report & Written Opinion for PCT Application No. PCT/US18/057190", dated Dec. 19,2018, 12 Pages.

* cited by examiner

Primary Examiner — Shean Tokuta
Assistant Examiner — Juan C Turriate Gastulo
(74) Attorney, Agent, or Firm — Arent Fox LLP

(57) ABSTRACT

Described are examples for indicating a local group identifier for peer-to-peer communications. A generated identifier can be broadcasted, by a device, to multiple other devices accessible in a network. Multiple broadcasted identifiers can also be received, by the device, from at least a portion of the multiple devices in the network. The device can determine the local group identifier based on the generated identifier and one or more of the multiple broadcasted identifiers. The device can report the local group identifier to a peer matching service to facilitate grouping the device with at least the portion of the multiple devices in the network for peer-to-peer communications.

20 Claims, 6 Drawing Sheets

TECHNIQUES FOR PEER MATCHING IN PEER-TO-PEER COMMUNICATIONS

BACKGROUND

In peer-to-peer networks, a first device connects with one or more peer devices to facilitate data acquisition or other communications. A peer matching service can manage peer matching of the devices in order to associate the devices for facilitating the data acquisition. For instance, the peer matching service may use one or more algorithms to determine desirable peer devices for matching or association. The peer matching service may associate devices as peers based on the devices having a same or similar external internet protocol (IP) address, which may be assumed to indicate that the devices are part of the same local area network (LAN) or other underlying network. In private networks, however, it is possible to have an architecture based on which devices associated with the same external IP address may not necessarily be accessible to one another. For example, a private network may have multiple subnetworks of connected devices, where devices of one subnetwork may not have access to devices of other subnetworks. The subnetworks, however, may be coupled to the same router such that the external IP address for each of the devices of the subnetworks may be the same. Thus, present mechanisms for associating peer devices may result in associating devices based on external IP address though the devices may not be able to communicate with one another within the corresponding private network. In other network configurations, devices within a subnetwork or otherwise accessible by one another may be associated with different routers or other network components causing different external IP addresses, and thus may not be matched, by the peer matching service, for peer-to-peer communications though matching may be possible and/or desirous.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

In an example, a method for indicating a local group identifier for peer-to-peer communications is provided. The method includes broadcasting, by a device, a generated identifier to multiple devices accessible in a network, receiving, by the device, multiple broadcasted identifiers from at least a portion of the multiple devices in the network, determining, by the device, the local group identifier based on the generated identifier and one or more of the multiple broadcasted identifiers, and reporting, by the device, the local group identifier to a peer matching service to facilitate grouping the device with at least the portion of the multiple devices in the network for peer-to-peer communications.

In another example, a device for indicating a local group identifier for peer-to-peer communications is provided. The device includes a memory storing one or more parameters or instructions for generating the local group identifier, and at least one processor coupled to the memory. The at least one processor is configured to broadcast a generated identifier to multiple devices accessible in a network, receive multiple broadcasted identifiers from at least a portion of the multiple devices in the network, determine the local group identifier based on the generated identifier and one or more of the multiple broadcasted identifiers, and report the local group identifier to a peer matching service to facilitate grouping the device with at least the portion of the multiple devices in the network for peer-to-peer communications.

In another example, a computer-readable medium, including code executable by one or more processors for indicating a local group identifier for peer-to-peer communications is provided. The code includes code for broadcasting, by a device, a generated identifier to multiple devices accessible in a network, receiving, by the device, multiple broadcasted identifiers from at least a portion of the multiple devices in the network, determining, by the device, the local group identifier based on the generated identifier and one or more of the multiple broadcasted identifiers, and reporting, by the device, the local group identifier to a peer matching service to facilitate grouping the device with at least the portion of the multiple devices in the network for peer-to-peer communications.

In another example, a method for associating devices for peer-to-peer communications is provided. The method includes receiving, from a first device, a first indication of a local group identifier associating the first device with multiple devices in a network and an external address for communicating with the first device outside of the network, receiving, from a second device, a second indication of the local group identifier associating the second device with the first device and the multiple devices in the network, associating, based on receiving the first indication of the local group identifier and the second indication of the local group identifier, the first device with the second device for performing peer-to-peer communications, and instructing, based on associating the first device with the second device, one of the first device or the second device to establish a connection with the other one of the first device or the second device to facilitate the peer-to-peer communications.

To the accomplishment of the foregoing and related ends, the one or more implementations comprise the features hereinafter fully described and particularly pointed out in the claims. The following description and the annexed drawings set forth in detail certain illustrative features of the one or more implementations. These features are indicative, however, of but a few of the various ways in which the principles of various implementations may be employed, and this description is intended to include all such implementations and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to associating devices accessible in a network based on a local group identifier that can be resolved and reported by the devices. For example, the devices can report the local group identifier to a peer matching service, and the peer matching service can associate the devices with one another to facilitate peer-to-peer communications among the devices. In an example, the devices may broadcast identifiers as candidates for the local group identifier, and each of the devices able to receive the identifiers can determine which of the candidates to set as the local group identifier, such that each of the devices select the same candidate and report the candidate as the local group identifier to the peer matching service. For example, the devices may perform a comparison of the candidates in a deterministic manner to arrive at the same local group identifier. In a specific example, the devices may select a candidate having a maximum value out of the set of candidates as the local group identifier. In any case, all of the devices that can receive the broadcast messages can set the same local group identifier, and the peer matching service can accordingly determine to associate all of these devices for peer-to-peer communications.

Figure 2:
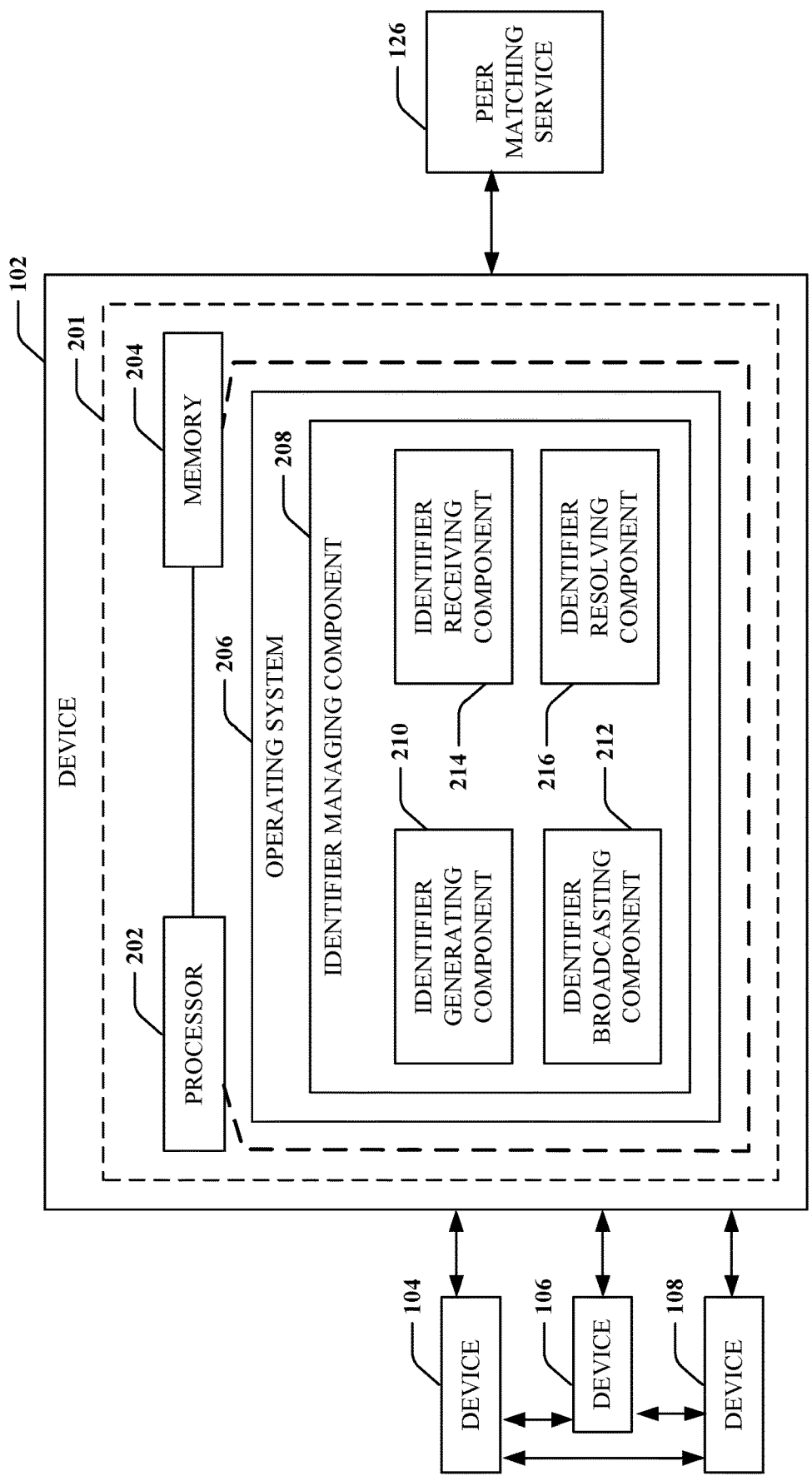
FIG. 2 is a schematic diagram of an example of a device for generating and reporting a local group identifier in accordance with examples described herein.
Figure 3:
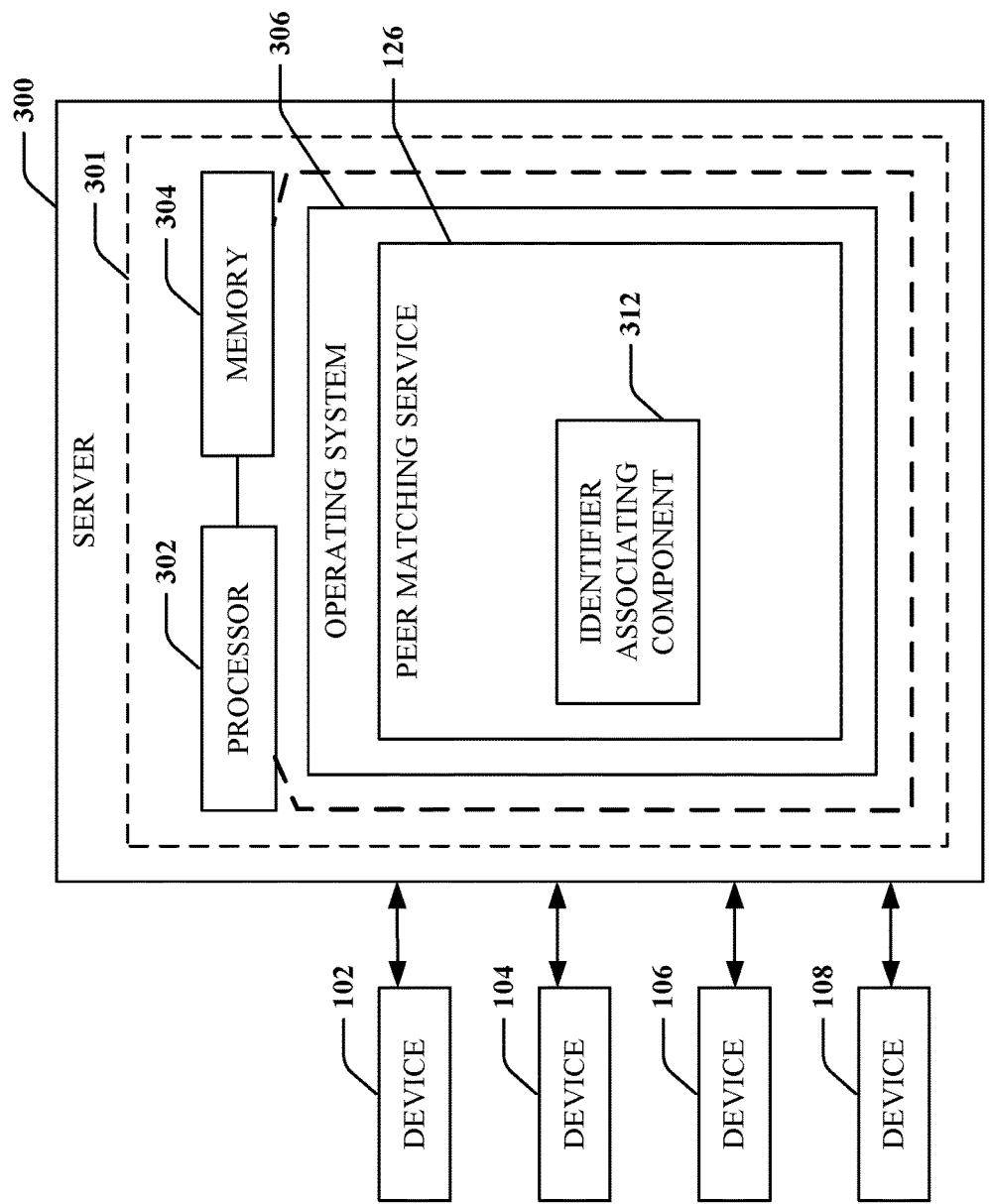
FIG. 3 is a schematic diagram of an example of a server for associating devices for peer-to-peer communications in accordance with examples described herein.
Figure 4:
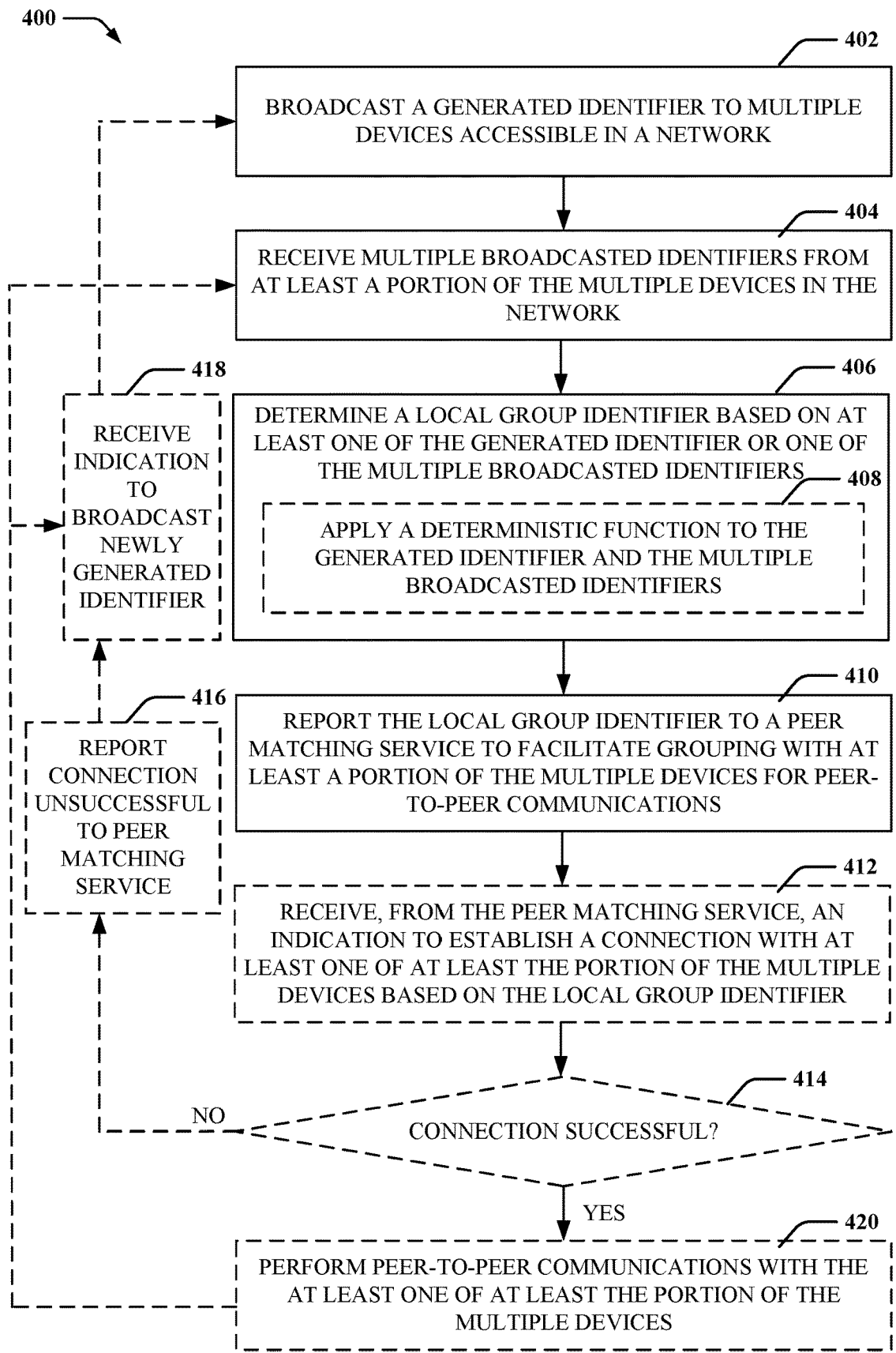
FIG. 4 is a flow diagram of an example of a method for generating and reporting a local group identifier in accordance with examples described herein.
Figure 5:
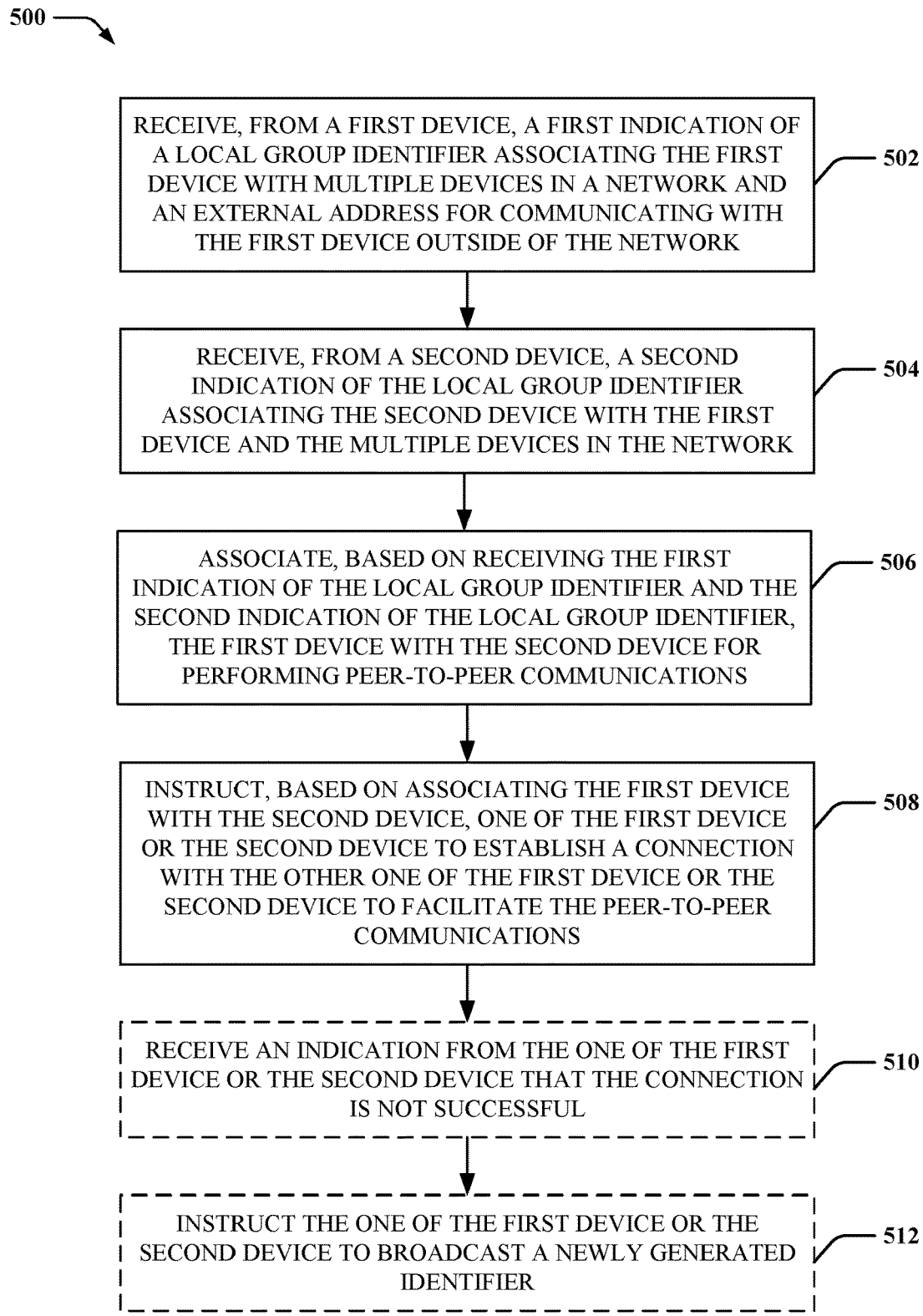
FIG. 5 is a flow diagram of an example of a method for associating devices for peer-to-peer communications in accordance with examples described herein.

Turning now to FIGS. 1-6, examples are depicted with reference to one or more components and one or more methods that may perform the actions or operations described herein, where components and/or actions/operations in dashed line may be optional. Although the operations described below in FIGS. 4 and 5 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

Figure 1:
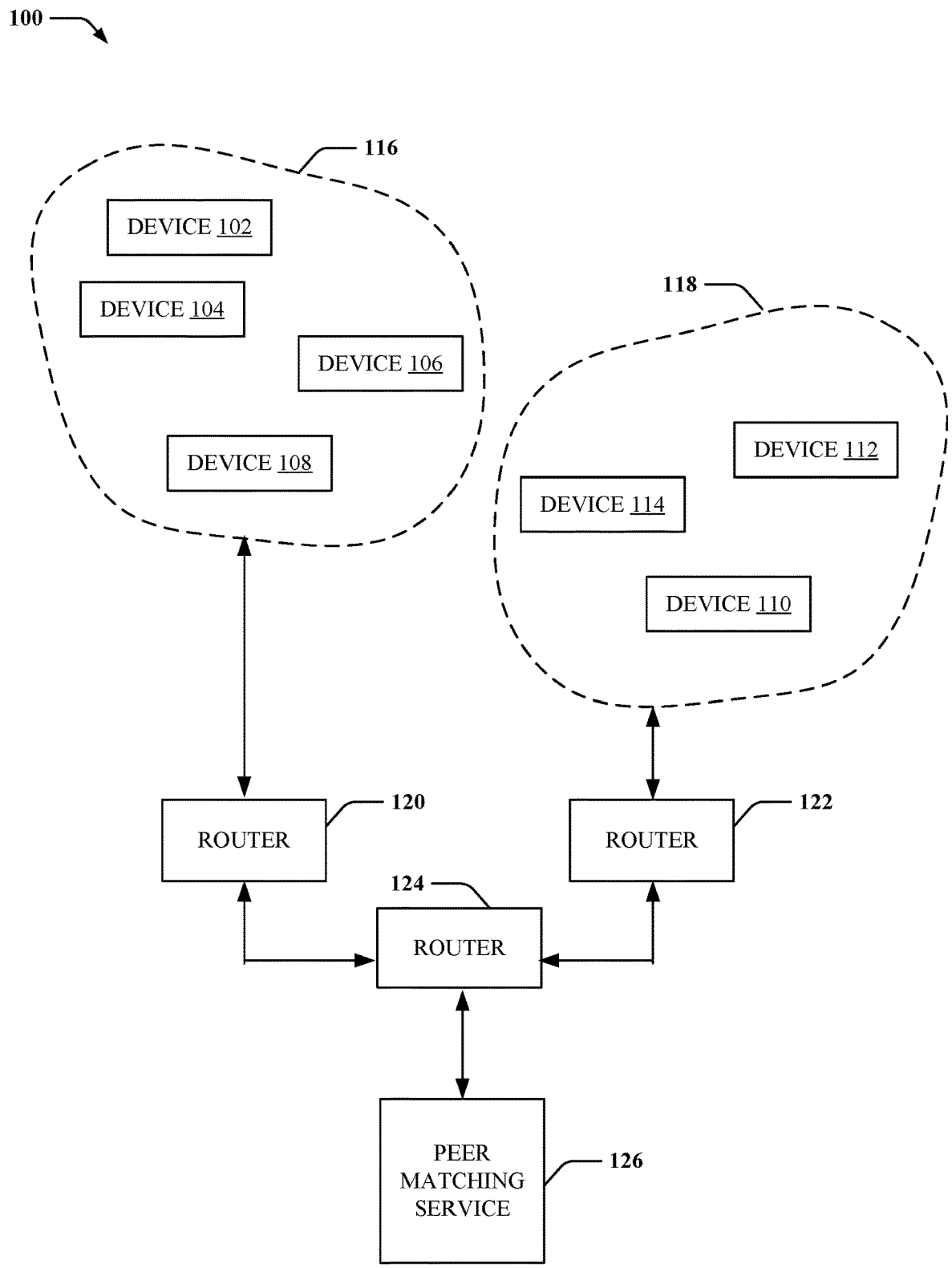
FIG. 1 is a schematic diagram of an example of a network including various devices that can participate in peer-to-peer communications in accordance with examples described herein.

FIG. 1 is a schematic diagram of an example of a system 100 including various devices 102, 104, 106, 108, 110, 112, 114, which can be communicatively coupled with one or more components of a private network. In an example, devices 102, 104, 106, 108 can be communicatively coupled with one another (e.g., via one or more hubs, gateways, or other access points), and devices 110, 112, 114 can be communicatively coupled with one another (e.g., via one or more other hubs, gateways, or other access points). However, not all of the devices may be able to communicate with one another. For example, device 102 may not be communicatively coupled with device 110. Though the devices 102, 110 may be part of the same private network, one or more security measures, network architectural features, and/or the like, may prevent communications between the devices 102, 110.

In one example, devices 102, 104, 106, 108 can be part of a subnetwork 116 and devices 110, 112, 114 can be part of a separate subnetwork 118. The subnetworks 116, 118, in one example, may be provided by way of network hardware components connecting the devices in the subnetwork but preventing access of the other devices outside of the subnetwork. For example, subnetworks 116, 118 may have respective routers 120, 122 to facilitate communications between respective devices and other components of the network.

The devices 102, 104, 106, 108, 110, 112, 114 can communicate with a peer matching service 126 through one or more other network components (e.g., routers 120, 122, 124). The peer matching service 126 can manage handing out or pairing client devices for peer-to-peer communications, and may typically use one or more algorithms to choose peers that are close to one another in the network (e.g., less than a threshold geographical distance, being part of the same internet service provider (ISP), having less than a threshold number of hops (e.g., traversing devices) between the devices, having less than a threshold network backbone distance, etc.).

Devices on the same network, assuming they can access one another, are typically the best peers, and peer matching service 126 can prioritize devices on the same network to be paired or otherwise associated with one another for peer-to-peer communications. Conventional peer matching services assume these devices are LAN routable based on having the same reported external IP address (e.g., an address of router 124 that communicates with peer matching service 126). This may not be the case, however, as shown in the depicted example. In this example of FIG. 1, within the network accessible via router 124, router 120 may prevent devices of subnetwork 118 and/or other devices from communicating directly with devices of subnetwork 116 and/or vice versa (e.g., and thus it can be said that the subnetworks 116, and 118, and/or associated devices, are not LAN routable). In this regard, devices in different subnetworks 116, 118 may not be desirable peers in peer-to-peer communications, though the devices may be in the same underlying private network, due to the fact that the devices in the different subnetworks 116, 118 may not communicate with one another. Accordingly, as described further herein, devices 102, 104, 106, 108 can negotiate a local group identifier to be used by a peer matching service 126 (e.g., instead of or in addition to external IP address) to identify peers in facilitating peer-to-peer communications. Moreover, in an example, device 102 may be routable to another device (not shown) that uses a different external IP address. In this example, the devices may similarly negotiate a local group identifier so the peer matching service 126 can match the devices for peer-to-peer communications based on the local group identifier (e.g., instead of external IP address).

In either case, for example, devices 102, 104, 106, 108 can each generate an identifier, and may broadcast the identifier to one another. The devices 102, 104, 106, 108 can use a deterministic function to compare all broadcasted identifiers and accordingly determine the local group identifier to be used by all of the devices 102, 104, 106, 108 based on the broadcasted identifiers. Devices 110, 112, 114 can perform similar functions to determine a separate local group identifier. In either case, devices 102, 104, 106, 108, 110, 112, 114 can each report the local group identifier to the peer matching service 126 (e.g., by traversing router 120 or 122, and 124), and the peer matching service 126 can use the local group identifiers to determine peers for one or more of the devices in peer-to-peer communications (e.g., instead of using external IP address, which may be the same address for the devices, such as the IP address of router 124).

In addition, for example, devices 102, 104, 106, 108, 110, 112, 114 can report back peer-to-peer connection attempts to the peer matching service 126, which can allow the peer matching service 126 to determine when the local group identifier results in a failed connection attempt. In this example, peer matching service 126 may command devices associated with the same local group identifier to select a different local group identifier. In an example, this can be used to handle the case where devices in different subnetworks 116, 118 select the same local group identifier.

FIG. 2 is a schematic diagram of an example of a device 102 (e.g., a computing device) that can resolve and report a local group identifier for facilitating peer-to-peer communications. In an example, device 102 can include a processor 202 and/or memory 204 configured to execute or store instructions or other parameters related to providing an operating system 206, which can execute one or more applications, services, etc. The one or more applications, services, etc. may include an identifier managing component 208 to generate and/or select a local group identifier for reporting to a peer matching service 126. For example, processor 202 and memory 204 may be separate components communicatively coupled by a bus (e.g., on a motherboard or other portion of a computing device, on an integrated circuit, such as a system on a chip (SoC), etc.), components integrated within one another (e.g., processor 202 can include the memory 204 as an on-board component 201), and/or the like. Memory 204 may store instructions, parameters, data structures, etc., for use/execution by processor 202 to perform functions described herein.

Identifier managing component 208 can provide the local group identifier determining and/or reporting functionality including negotiating the local group identifier among multiple devices 104, 106, 108 accessible by device 102 in a private network, and reporting the local group identifier to the peer matching service 126 (at least for the device 102). In an example, identifier managing component 208 can include an identifier generating component 210 for generating an identifier (e.g., as a random number, token, string, etc., a sequential number, token, string, etc., and/or the like), an identifier broadcasting component 212 for broadcasting the generated identifier to devices 104, 106, 108 and/or other devices that can receive the broadcast message (which can imply that the device 102 can access the devices 104, 106, 108), an identifier receiving component 214 for receiving a broadcasted identifier from other devices (e.g., devices 104, 106, 108 and/or other devices from which device 102 can receive broadcast messages), and/or an identifier resolving component 216 for determining a local group identifier to use based on the generated identifier and the other broadcasted identifier(s).

In one example, identifier resolving component 216 can select one of the identifiers, generate a separate local group identifier based on the identifiers, etc., using a deterministic function such that all devices 102, 104, 106, 108 that are receiving each other's broadcasted identifiers can determine the same local group identifier. In any case, identifier managing component 208 can provide the local group identifier to peer matching service 126, as described further herein, to facilitate associating with devices 104, 106, 108 for peer-to-peer communications.

FIG. 3 is a schematic diagram of an example of a server 300 (e.g., a computing device) that can provide a peer matching service 126 to facilitate peer-to-peer communications among devices in one or more networks. In an example, server 300 can include a processor 302 and/or memory 304 configured to execute or store instructions or other parameters related to providing an operating system 306, which can execute one or more applications, services, etc. The one or more applications, services, etc. may include the peer matching service 126 to associate devices for participating in peer-to-peer communications. For example, processor 302 and memory 304 may be separate components communicatively coupled by a bus (e.g., on a motherboard or other portion of a computing device, on an integrated circuit, such as a system on a chip (SoC), etc.), components integrated within one another (e.g., processor 302 can include the memory 304 as an on-board component 301), and/or the like. Memory 304 may store instructions, parameters, data structures, etc., for use/execution by processor 302 to perform functions described herein.

Peer matching service 126 can include an identifier associating component 312 for receiving and/or associating a local group identifier to one or more devices 102, 104, 106, 108 and reporting the local group identifier. Though not shown in this Figure, devices 102, 104, 106, 108 may also be communicatively coupled to one another (as shown in other Figures). For example, as described, devices 102, 104, 106, 108 may generate and report the same local group identifier to the peer matching service 126 (e.g., in registering for peer-to-peer communications). Identifier associating component 312 can accordingly receive the reported local group identifier from each of the devices 102, 104, 106, 108, and can associate the local group identifier with the devices for subsequent peer-to-peer communications. In one example, this may also include identifier associating component 312 determining that the reported local group identifiers match (or, in the case of multiple received local group identifiers from multiple sets of devices, determine which sets of devices report matching identifiers). For example, identifier associating component 312 can instruct one of the devices 102, 104, 106, 108 to establish a peer-to-peer connection to one or more of the other devices 102, 104, 106, 108 to initiate peer-to-peer communications (e.g., to concurrently download a file or other content from multiple devices). In this example, identifier associating component 312 can determine to instruct the one of the devices 102, 104, 106, 108 based on determining the local group identifier for the device is the same as, or similar to, the local group identifier associated with the one or more of the other devices 102, 104, 106, 108.

FIG. 4 is a flowchart of an example of a method 400 for determining and reporting a local group identifier for peer-to-peer communications. For example, method 400 can be performed by a device 102 (as described mostly in conjunction with FIG. 2) and/or one or more components thereof.

In method 400, at action 402, a generated identifier can be broadcast to multiple devices accessible in a network. In an example, identifier generating component 210, e.g., in conjunction with processor 202, memory 204, operating system 206, identifier managing component 208, etc., can generate the identifier, and identifier broadcasting component 212, e.g., in conjunction with processor 202, memory 204, operating system 206, identifier managing component 208, etc., can broadcast the generated identifier to the multiple devices in the network (e.g., devices 104, 106, 108). For example, identifier generating component 210 can generate the identifier as a candidate for a local group identifier to be used by devices with which device 102 can communicate in the network. For example, identifier generating component 210 can generate the identifier as a random number, a unique identifier (UID), which may be determined based at least in part on another identifier of device 102 (e.g., an identifier associated with hardware of the device 102), a counter, timer, or other incremented or decremented value, and/or the like.

Identifier broadcasting component 212 can broadcast the generated identifier to the one or more devices 104, 106, 108 using a broadcast mechanism associated with the network. For example, device 102 may use a user datagram protocol (UDP) broadcast message to broadcast the generated identifier. In this example, any device that can receive the UDP broadcast can presumably communicate with device 102 (and/or with one another) in the network, and thus can potentially use the generated identifier as the local group identifier for registering with the peer matching service 126. For example, referring to FIG. 1, devices 102, 104, 106, 108 can be in the same subnetwork 116 of the network, which can indicate that the devices 102, 104, 106, 108 can communicate with one another. The subnetwork 116 can define or otherwise limit communication between the devices 102, 104, 106, 108 via one or more hardware boundaries, security policies, etc.

For example, devices 102, 104, 106, 108 can be associated with a gateway, hub, router 120, or other network component that manage internal communications among the devices 102, 104, 106, 108 and/or external communications with other devices. For example, a firewall can be implemented (e.g., by router 120) to prevent access to devices 102, 104, 106, 108 by other devices (e.g., devices 110, 112, 114), though the other devices may be part of the same overall network. In another example, different security policies implemented at a higher network layer may prevent some devices outside of the subnetwork 116 from accessing devices 102, 104, 106, 108. In either case, the devices 102, 104, 106, 108 may be agnostic as to the hardware and/or policies that manage communications from other devices. Thus, devices 102, 104, 106, 108 can generate and broadcast identifiers, as descried above and further herein, and can assume that devices receiving the broadcasted identifiers can be accessible by (and thus can participate in peer-to-peer communications with) the broadcasting device(s).

In addition, identifier generating component 210 can generate, and identifier broadcasting component 212 can broadcast, the identifier based on one or more detected triggers or events. For example, identifier generating component 210 can generate, and identifier broadcasting component 212 can broadcast, the identifier based on determining to initiate peer-to-peer communications (e.g., as instructed by a peer matching service 126 or otherwise), based on detecting failure of peer-to-peer communications with a device (e.g., as instructed by a peer matching service 126), based on receiving or determining an indication of an expiring local group identifier, and/or the like.

In method 400, at action 404, multiple broadcasted identifiers can be received from at least a portion of the multiple devices in the network. In an example, identifier receiving component 214, e.g., in conjunction with processor 202, memory 204, operating system 206, identifier managing component 208, etc., can receive the multiple broadcasted identifiers from at least the portion of the multiple devices in the network. For example, identifier receiving component 214 can receive identifiers broadcasted from other devices (e.g., devices 104, 106, 108), which can include devices in the same subnetwork that similarly broadcast the identifiers via UDP protocol or other broadcast message. As described, the ability to receive the broadcast message can imply that the devices can communicate with one another in the network, and thus the devices can use the received identifiers to deterministically select a local group identifier applicable to all of the devices that receive the broadcasted identifiers, such to group the devices for peer-to-peer communications, as discussed with respect to action 406.

In method 400, at action 406, a local group identifier can be determined based on the generated identifier and one or more of the multiple broadcasted identifiers. In an example, identifier resolving component 216, e.g., in conjunction with processor 202, memory 204, operating system 206, identifier managing component 208, etc., can determine the local group identifier based on the generated identifier and one or more of the multiple broadcasted identifiers. In one example, identifier resolving component 216 can determine the local group identifier to be one of the generated identifier or one of the multiple broadcasted identifiers.

In one example, determining the local group identifier at action 406 may optionally include, at action 408, applying a deterministic function to the generated identifier and the multiple broadcasted identifiers. In an example, identifier resolving component 216, e.g., in conjunction with processor 202, memory 204, operating system 206, identifier managing component 208, etc., can apply the deterministic function to the generated identifier and the multiple broadcasted identifiers. For example, the deterministic function can include selecting the identifier having the highest value of the generated identifier or one of the multiple broadcasted identifiers. In another example, the deterministic function can include selecting the identifier having a lowest value, a median value, etc. In other examples, the deterministic function can include generating a new identifier based on the generated identifier and/or one or more of the multiple broadcasted identifiers, such as a computed average value, a sum of the values, a concatenation of values, etc. In any case, each device 102, 104, 106, 108 can generate the same local group identifier given its own broadcasted identifier and the identifiers received from other device broadcasts by using the same deterministic function.

In method 400, at action 410, the local group identifier can be reported to a peer matching service to facilitate grouping with at least a portion of the multiple devices for peer-to-peer communications. In an example, identifier managing component 208, e.g., in conjunction with processor 202, memory 204, operating system 206, etc., can report the local group identifier to the peer matching service 126 to facilitate grouping the device 102 with at least a portion of the multiple devices (e.g., devices 104, 106, 108) based on the local group identifier (e.g., based on devices 104, 106, 108 reporting the same local group identifier, as described). In one example, identifier managing component 208 can report the local group identifier when registering with peer matching service 126 to receive peer-to-peer communications. For example, peer matching service 126 may query device 102 for the local group identifier based on device 102 registering with the peer matching service 126. Moreover, for example, device 102 can register with the peer matching service 126 based on one or more triggers or detected events, such as a request for a peer-to-peer communication resource (e.g., a download of a file or other resource that may be facilitated and/or expedited by concurrently accessing multiple devices), as part of device 102 registering with the network, and/or the like. As described in further detail herein, the peer matching service 126 can use the local group identifier to determine peers for associating in the peer-to-peer communications such as to allow device 102 to communicate with one or more of device 104, 106, 108 to concurrently receiving a file or resource and/or the like based on the devices 102, 104, 106, 108 reporting the same local group identifier.

In method 400, optionally at action 412, an indication can be received, from the peer matching service, to establish a connection with at least one of at least the portion of the multiple devices based on the local group identifier. In an example, operating system 206, or one or more applications executing thereon that may include a peer-to-peer communication service (not shown), e.g., in conjunction with processor 202, memory 204, etc., can receive, from the peer matching service 126, an indication to establish a connection with at least one of the portion of the multiple devices based on the local group identifier. Thus, the operating system 106, application(s) executing on the operation system 106, etc., can accordingly request the connection with at least one of devices 104, 106, 108 to establish peer-to-peer communications (e.g., to receive a file or other resource, concurrently or otherwise, from one or more of devices 104, 106, 108).

The device 102 can accordingly attempt to establish the connection with the at least one of the at least the portion of the multiple devices to facilitate peer-to-peer communications between the devices. In method 400, optionally at action 414, it can be determined whether the establishment of the connection with at least one of at least the portion of the multiple devices is successful. In an example, operating system 206, or one or more applications executing thereon, e.g., in conjunction with processor 202, memory 204, etc., can determine whether the establishment of the connection with at least one of at least the portion of the multiple devices is successful. If not, this can indicate that the device may be another device in a different subnetwork to which device 102 cannot communicate (e.g., device 112 in subnetwork 118), and that this device may be using the same local group identifier. Thus, for example, the method 400 can proceed to action 402 to broadcast a newly generated identifier to the multiple devices accessible in the network. For example, the newly generated identifier can include an incremented value from a previously generated identifier and/or a previous local group identifier. In other example, the newly generated identifier can be randomly generated, generated based on a UID, etc., as described above. The method 400 can then include the steps of potentially receiving other identifiers from other devices in the network, determining the local group identifier, and reporting the local group identifier, as described above in actions 404, 406, 410.

In one example, prior to proceeding to action 402, optionally at 416, connection unsuccessful can be reported to the peer matching service. In an example, operating system 206, or one or more applications executing thereon, e.g., in conjunction with processor 202, memory 204, etc., can report connection unsuccessful to the peer matching service 126. In one example, operating system 206, or one or more applications executing thereon can indicate an error code received when attempting to establish connection, which may indicate whether the connection attempt failed to the fact that the device 102 does not have access to the at least one of at least the portion of the multiple devices. In this example, the peer matching service 126 may instruct the device 102 to generate a new identifier (e.g., as the failed connection attempt may indicate another device in a non-routable group is using the same identifier).

In this or another example, prior to proceeding to action 402, optionally at 418, an indication to broadcast a newly generated identifier can be received. In an example, operating system 206, or one or more applications executing thereon, e.g., in conjunction with processor 202, memory 204, etc., can receive the indication to broadcast the newly generated identifier. For example, operating system 206, or one or more applications executing thereon, can receive the indication from the peer matching service 126, in response to reporting connection unsuccessful or otherwise. In another example, the local group identifier may have an associated expiration time, which may be managed by each device 102, 104, 106, 108 generating the local group identifier or the peer matching service 126. In the latter case, the indication received at action 418 may correspond to an indication based on detecting expiration of the local group identifier. In another example, for example, where device 102 manages the expiration, the indication can be received at action 418 following performing peer-to-peer communications at action 420 (e.g., based on identifier managing component 208 detecting expiration of an associated expiration timer for the local group identifier).

If, however, the connection is determined to be successful at action 414, then optionally, at action 416, peer-to-peer communications can be performed with the at least one of at least the portion of the multiple devices. In an example, operating system 206, or one or more applications executing thereon, e.g., in conjunction with processor 202, memory 204, etc., can perform the peer-to-peer communications such to receive a file or other resource from the at least one of at least the portion of the multiple devices. In one example, after performing peer-to-peer communications, the method 400 may optionally proceed to action 404 where one or more different broadcasted identifiers are received from one or more of the multiple devices, which may cause another local group identifier to be generated at action 406 and reported at action 410, as described.

FIG. 5 is a flowchart of an example of a method 500 for associating devices in peer-to-peer communications based on a reported local group identifier. For example, method 500 can be performed by a peer matching service 126 and/or one or more components thereof.

In method 500, at action 502, a local group identifier, associating a first device with multiple devices in a network, and an external address for communicating with the first device outside of the network, can be received from the first device. In an example, peer matching service 126, e.g., in conjunction with processor 302, memory 304, operating system 306, peer matching service 126, etc., can receive, from the first device (e.g., device 102), the local group identifier associating the first device with multiple devices in the network (e.g., devices 104, 106, 108) and an external address for communicating with the first device outside of the network. For example, peer matching service 126 can receive, via a wired or wireless communication link, the local group identifier in a registration request from the first device (e.g., device 102) in registering to receive or perform peer-to-peer communications. As described, peer matching service 126 can receive the same local group identifier from other devices 104, 106, 108 using the same set of broadcasted identifiers and/or the same deterministic function to determine the local group identifier. Thus, devices 102, 104, 106, 108 can indicate the same local group identifiers to associate with one another in the peer matching service 126.

In method 500, at action 504, a second indication, of the local group identifier associating a second device with the first device and the multiple devices in the network, can be received from the second device. In an example, peer matching service 126, e.g., in conjunction with processor 302, memory 304, operating system 306, peer matching service 126, etc., can receive, from the second device, the second indication of the local group identifier associating the second device with the first device and the multiple devices in the network. For example, the peer matching service 126 can receive the second indication of the local group identifier from device 104, 106, 108 based on the device registering with the peer matching service 126 to receive or perform peer-to-peer communications, and the second indication can be determined based on the same set of broadcasted identifiers and the same deterministic function as the first indication of the local group identifier.

In method 500, at action 506, the first device can be associated, based on receiving the first indication of the local grouping identifier and the second indication of the local group identifier, with the second device for performing peer-to-peer communications. In an example, identifier associating component 312, e.g., in conjunction with processor 302, memory 304, operating system 306, peer matching service 126, etc., can associate, based on receiving the first indication of the local group identifier and the second indication of the local group identifier, the first device with the second device for performing peer-to-peer communications. For example, identifier associating component 312 can store the local group identifier (e.g., in memory 304 or another repository accessible by server 300) along with a list of identifiers of associated devices. For example, the devices 102, 104, 106, 108 can register with the peer matching service 126 using the local group identifier, and peer matching service 126 can store identifiers of devices 102, 104, 106, 108, an external IP address for communicating with each of devices 102, 104, 106, 108, and the local group identifier. In one example, this may also include peer matching service 126 matching the received identifiers. In this regard, the identifier associating component 312 can, based on a request from one of devices 102, 104, 106, 108 for peer-to-peer communications, recall the other ones of all the devices associated with the same local group identifier to facilitate peer-to-peer communications among the devices based on the local group identifier (e.g., instead of or in addition to the external IP address, as described). In one example, identifier associating component 312 can store a plurality of received local group identifiers and a corresponding set of one or more devices associated therewith.

In method 500, at action 508, one of the first device or the second device can be instructed, based on associating the first device with the second device, to establish a connection with the other one of the first device or the second device to facilitate peer-to-peer communications. In an example, identifier associating component 312, e.g., in conjunction with processor 302, memory 304, operating system 306, peer matching service 126, etc., can instruct, based on associating the first device (e.g., device 102) with the second device (e.g., device 104, 106, 108), one of the first device or the second device to establish the connection with the other one of the first device or the second device to facilitate the peer-to-peer communications. For example, the peer matching service 126 can determine the association of the first device and second device as related to the same local group identifier based on previously storing this information in memory 304 or other repository, and can provide, via a message to the first device (sent via the external IP address) an identifier of the second device (and/or other devices) associated with the local group identifier, to enable the first device to initiate peer-to-peer communications with the second device.

In method 500, optionally at action 510, an indication can be received from the one of the first device or the second device that the connection is not successful. In an example, peer matching service 126, e.g., in conjunction with processor 302, memory 304, operating system 306, etc., can receive the indication from the one of the first device or the second device that the connection is not successful. In one example, the indication may include an error code or other parameter indicating a reason why the connection between the devices is not successful. For example, the code may indicate that one device cannot access the other device due to a hardware limitation or security policy, etc.

In method 500, optionally at action 512, the one of the first device or the second device can be instructed to broadcast a newly generated identifier. In an example, peer matching service 126, e.g., in conjunction with processor 302, memory 304, operating system 306, etc., can instruct the one of the first device or the second device to broadcast the newly generated identifier. For example, peer matching service 126 may instruct the device(s) based on receiving the indication of the connection being unsuccessful. In another example, peer matching service 126 may instruct the device(s) based on detecting expiry of the local group identifier (e.g., based on detection expiration of a timer generated based on receiving an indication of the local group identifier from the one or more device), or based on detecting another event or trigger.

Figure 6:
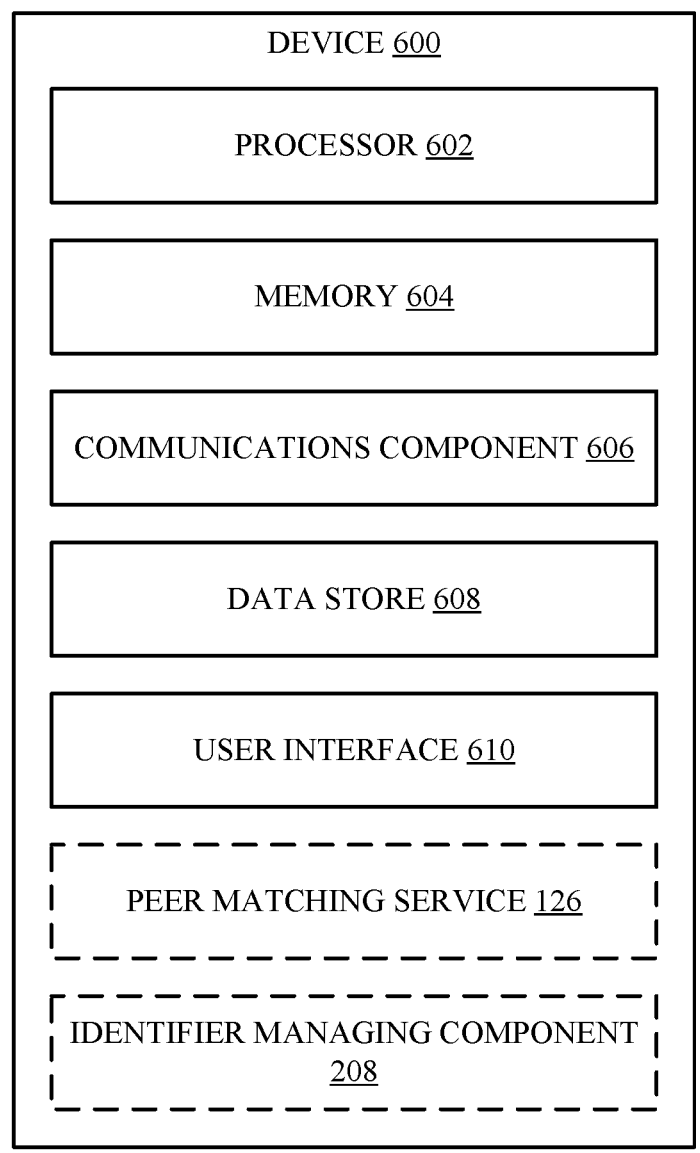
FIG. 6 is a schematic diagram of an example of a device for performing functions described herein.

FIG. 6 illustrates an example of device 600, similar to or the same as device 102, 104, 106, 108, 110, 112, 114, server 300, etc. (FIGS. 1-3), including additional optional component details as those shown in FIGS. 1-3. In one implementation, device 600 may include processor 602, which may be similar to processor 202, 302 for carrying out processing functions associated with one or more of components and functions described herein. Processor 602 can include a single or multiple set of processors or multi-core processors. Moreover, processor 602 can be implemented as an integrated processing system and/or a distributed processing system.

Device 600 may further include memory 604, which may be similar to memory 204, 304 such as for storing local versions of applications being executed by processor 602, such as peer matching service 126, identifier managing component 208, applications, related instructions, parameters, etc. Memory 604 can include a type of memory usable by a computer, such as random access memory (RAM), read only memory (ROM), tapes, magnetic discs, optical discs, volatile memory, non-volatile memory, and any combination thereof.

Further, device 600 may include a communications component 606 that provides for establishing and maintaining communications with one or more other devices, parties, entities, etc., utilizing hardware, software, and services as described herein. Communications component 606 may carry communications between components on device 600, as well as between device 600 and external devices, such as devices located across a communications network and/or devices serially or locally connected to device 600. For example, communications component 606 may include one or more buses, and may further include transmit chain components and receive chain components associated with a wireless or wired transmitter and receiver, respectively, operable for interfacing with external devices.

Additionally, device 600 may include a data store 608, which can be any suitable combination of hardware and/or software, that provides for mass storage of information, databases, and programs employed in connection with implementations described herein. For example, data store 608 may be or may include a data repository for applications and/or related parameters (e.g., peer matching service 126, identifier managing component 208, applications, etc.) not currently being executed by processor 602. In addition, data store 608 may be a data repository for peer matching service 126, identifier managing component 208, applications, and/or one or more other components of the device 600.

Device 600 may include a user interface component 610 operable to receive inputs from a user of device 600 and further operable to generate outputs for presentation to the user. User interface component 610 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 610 may include one or more output devices, including but not limited to a display, a speaker, a haptic feedback mechanism, a printer, any other mechanism capable of presenting an output to a user, or any combination thereof.

Device 600 may additionally include one of a peer matching service 126 for coordinating peer-to-peer communications among multiple devices based on an associated local group identifier, or an identifier managing component 208 for managing an identifier for reporting (e.g., by a peer-to-peer client device) to associate with other devices for peer-to-peer communications.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more implementations, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various implementations described herein. Various modifications to these implementations will be readily apparent to those skilled in the art, and the generic principles defined herein may be applied to other implementations. Thus, the claims are not intended to be limited to the implementations shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various implementations described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for indicating a local group identifier for peer-to-peer communications, comprising:
    broadcasting, by a device, a generated candidate identifier for a local group identifier to multiple devices accessible in a network;
    receiving, by the device and from at least a portion of the multiple devices in the network, multiple broadcasted candidate identifiers for the local group identifier, wherein one or more of the multiple broadcasted candidate identifiers are different from the generated candidate identifier;
    determining, by the device, based on the generated candidate identifier being different from the one or more of the multiple broadcasted candidate identifiers, and after broadcasting the generated candidate identifier, the local group identifier as being one of the generated candidate identifier and one or more of the multiple broadcasted candidate identifiers;
    reporting, by the device, the local group identifier to a peer matching service to facilitate grouping the device with at least the portion of the multiple devices in the network for peer-to-peer communications;
    receiving, by the device and from the peer matching service, an indication to generate a new local group identifier; and
    broadcasting, by the device and based on the indication, the new local group identifier to the multiple devices.

2. The method of claim 1, further comprising receiving, from the peer matching service, an indication to establish a connection with at least one of at least the portion of the multiple devices based on the local group identifier.

3. The method of claim 2, further comprising:
    attempting to establish the connection with the at least one of the portion of the multiple devices; and
    reporting, to the peer matching service, whether attempting to establish the connection is successful.

4. The method of claim 1, wherein determining the local group identifier includes applying a deterministic function to the generated candidate identifier and the multiple broadcasted candidate identifiers such that each of the multiple devices in the network selects the same identifier as the local group identifier based on the deterministic function.

5. The method of claim 4, wherein the deterministic function corresponds to determining the generated candidate identifier or one of the multiple broadcasted candidate identifiers having a highest value to be the local group identifier.

6. The method of claim 1, further comprising:
receiving an updated broadcasted identifier from one of the multiple devices in the network;
determining an updated local group identifier as the updated broadcasted identifier; and
reporting, to the peer matching service, the updated local group identifier to facilitate grouping the device with at least the portion of the multiple devices in the network for subsequent peer-to-peer communications.

7. The method of claim 1, further comprising:
detecting expiration of the local group identifier;
broadcasting, by the device, a newly generated identifier to the multiple devices accessible in the network;
generating a new local group identifier based at least in part on the newly generated identifier; and
reporting, to the peer matching service, the new local group identifier to facilitate grouping the device with at least the portion of the multiple devices in the network for subsequent peer-to-peer communications.

8. A device for indicating a local group identifier for peer-to-peer communications, comprising:
a memory storing one or more parameters or instructions for generating the local group identifier; and
at least one processor coupled to the memory, wherein the at least one processor is configured to:
broadcast a generated candidate identifier for a local group identifier to multiple devices accessible in a network;
receive, from at least a portion of the multiple devices in the network, multiple broadcasted candidate identifiers for the local group identifier, wherein one or more of the multiple broadcasted candidate identifiers are different from the generated candidate identifier;
determine, based on the generated candidate identifier being different from the one or more of the multiple broadcasted candidate identifiers, and after broadcasting the generated candidate identifier, the local group identifier as being one of the generated candidate identifier and one or more of the multiple broadcasted candidate identifiers;
report the local group identifier to a peer matching service to facilitate grouping the device with at least the portion of the multiple devices in the network for peer-to-peer communications;
receive, from the peer matching service, an indication to generate a new local group identifier; and
broadcasting, based on the indication, the new local group identifier to the multiple devices.

9. The device of claim 8, wherein the at least one processor is further configured to receive, from the peer matching service, an indication to establish a connection with at least one of at least the portion of the multiple devices based on the local group identifier.

10. The device of claim 9, wherein the at least one processor is further configured to:
attempt to establish the connection with the at least one of the portion of the multiple devices; and
report, to the peer matching service, whether attempting to establish the connection is successful.

11. The device of claim 8, wherein the at least one processor is configured to determine the local group identifier at least in part by applying a deterministic function to the generated candidate identifier and the multiple broadcasted candidate identifiers such that each of the multiple devices in the network selects the same identifier as the local group identifier based on the deterministic function.

12. The device of claim 11, wherein the deterministic function corresponds to determining the generated candidate identifier or one of the multiple broadcasted candidate identifiers having a highest value to be the local group identifier.

13. The device of claim 8, wherein the at least one processor is further configured to:
receive an updated broadcasted identifier from one of the multiple devices in the network;
determine an updated local group identifier as the updated broadcasted identifier; and
report, to the peer matching service, the updated local group identifier to facilitate grouping the device with at least the portion of the multiple devices in the network for subsequent peer-to-peer communications.

14. The device of claim 8, wherein the at least one processor is further configured to:
detect expiration of the local group identifier;
broadcast a newly generated identifier to the multiple devices accessible in the network;
generate a new local group identifier based at least in part on the newly generated identifier; and
report, to the peer matching service, the new local group identifier to facilitate grouping the device with at least the portion of the multiple devices in the network for subsequent peer-to-peer communications.

15. A non-transitory computer-readable medium, comprising code executable by one or more processors for indicating a local group identifier for peer-to-peer communications, the code comprising code for:
broadcasting, by a device, a generated candidate identifier for a local group identifier to multiple devices accessible in a network;
receiving, by the device and from at least a portion of the multiple devices in the network, multiple broadcasted candidate identifiers for the local group identifier, wherein one or more of the multiple broadcasted candidate identifiers are different from the generated candidate identifier;
determining, by the device, based on the generated candidate identifier being different from the one or more of the multiple broadcasted candidate identifiers, and after broadcasting the generated candidate identifier, the local group identifier as being one of the generated candidate identifier and one or more of the multiple broadcasted candidate identifiers;
reporting, by the device, the local group identifier to a peer matching service to facilitate grouping the device with at least the portion of the multiple devices in the network for peer-to-peer communications;
receiving, by the device and from the peer matching service, an indication to generate a new local group identifier; and
broadcasting, by the device and based on the indication, the new local group identifier to the multiple devices.

16. The non-transitory computer-readable medium of claim 15, further comprising code for receiving, from the peer matching service, an indication to establish a connection with at least one of at least the portion of the multiple devices based on the local group identifier.

17. The non-transitory computer-readable medium of claim 15, wherein the code for determining the local group identifier includes code for applying a deterministic function to the generated candidate identifier and the multiple broadcasted candidate identifiers such that each of the multiple devices in the network selects the same identifier as the local group identifier based on the deterministic function.

18. A method for associating devices for peer-to-peer communications, comprising:

receiving, by a service and from a first device, a first indication of a local group identifier associating the first device with multiple devices in a network and an external address for communicating with the first device outside of the network;

receiving, by the service and from a second device, a second indication of the local group identifier associating the second device with the first device and the multiple devices in the network;

associating, based on receiving the first indication of the local group identifier and the second indication of the local group identifier, the first device with the second device for performing peer-to-peer communications;

instructing, based on associating the first device with the second device, one of the first device or the second device to establish a connection with the other one of the first device or the second device to facilitate the peer-to-peer communications;

receiving, by the service and from the one of the first device or the second device, an indication of whether the connection is successful; and instructing, by the service, the one of the first device or the second device to expire the local group identifier based on receiving the indication that the connection is not successful.

19. The method of claim 18, wherein instructing the one of the first device or the second device comprises transmitting a message to the first device via the external address, wherein the message indicates an identifier of the second device for establishing the peer-to-peer communications.

20. The method of claim 18, further comprising instructing the one of the first device or the second device to expire the local group identifier based on detecting expiration of a timer related to the local group identifier.

* * * * *